United States Patent [19]
Richmond

[11] 3,741,520
[45] June 26, 1973

[54] BELLOWS SEALED SHUTOFF VALVE
[75] Inventor: Thomas C. Richmond, Cumberland, R.I.
[73] Assignee: U.S. Philips Corporation, New York, N.Y.
[22] Filed: Apr. 13, 1970
[21] Appl. No.: 27,935

[52] U.S. Cl............ 251/144, 251/325, 251/335 B, 251/340
[51] Int. Cl............................................. F16k 1/50
[58] Field of Search............... 251/144, 335 B, 186, 251/325, 264, 266, 268, 269, 273, 340; 138/89; 62/6

[56]      References Cited
        UNITED STATES PATENTS
2,125,554  8/1938  Franck................. 251/340
2,831,326  4/1958  Richards et al.......... 251/340 X
2,962,040  11/1960 Simmons................ 251/335 B X
3,573,863  4/1971  Doors et al............ 251/335 B
3,103,341  9/1963  Moran.................. 251/273 X
2,302,089  11/1942 Aller.................. 251/340

2,625,955  1/1953  Day.................... 138/89
2,325,325  7/1943  Kiene.................. 251/340
2,966,035  12/1960 Gifford................ 62/6
3,115,016  12/1963 Hogan.................. 62/6

FOREIGN PATENTS OR APPLICATIONS
596,938    8/1925  France................. 251/335 B
1,182,363  1/1959  France................. 251/340
716,500    12/1941 Germany................ 251/340

Primary Examiner—William R. Cline
Attorney—Frank R. Trifari

[57]           ABSTRACT

A positive-shutoff valve in combination with a chamber chargeable with a fluid under pressure, the valve having a tubular base with a valve seat, a coaxially movable piston cooperating with this seat to close the valve, and a flexible, tubular metal enclosure surrounding a sealed flow chamber between said seat and a second duct through the piston. An actuator moves the piston between open and closed positions, and an auxiliary closure seals the piston duct.

2 Claims, 6 Drawing Figures

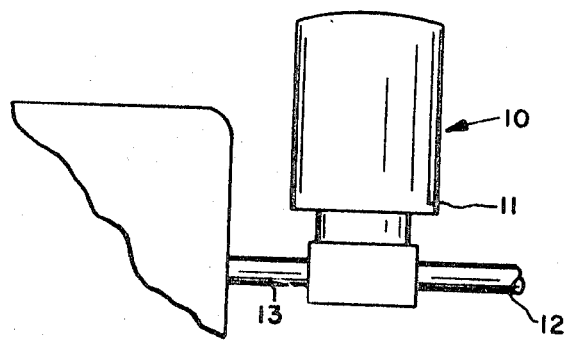
Fig. 1
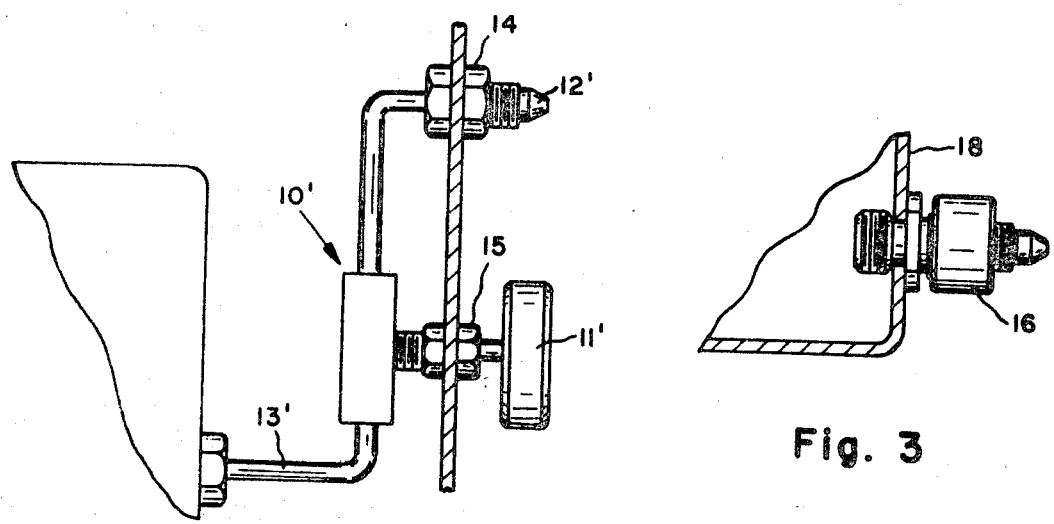
Fig. 2
Fig. 3
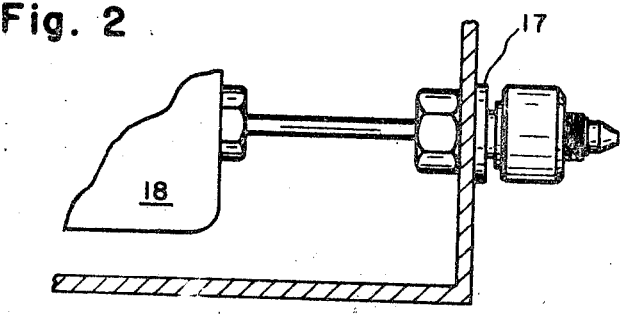
Fig. 4

BELLOWS SEALED SHUTOFF VALVE

BACKGROUND OF THE INVENTION

In thermodynamic apparatus having pressurized fluid reservoirs, such as Stirling cycle cryogenic refrigerators which utilize compressed helium gas as a working fluid, generally there is a principal inlet-outlet valve for filling the reservoir and for securing this reservoir against subsequent leakage. Gate valves and globe valves are the standard and most commonly used valves for many applications, because they are efficient, widely available, and very reasonable in cost. It has been found, however, where the cryogenic refrigeration apparatus in question is miniaturized, as for use in military equipment, these known valves are quite unsatisfactory, as regards both function and size.

Of the various gate and globe valves, each has a body part, an outlet port, an inlet port, and a handle. Where the outlet is connected to an apparatus bulkhead, the handle and inlet extend outward and as such occupy a substantial amount of space; where the refrigerator and valve body components are both encased, the enclosing housing must have a first aperture to expose the inlet port of the valve, and a second aperture through which the handle extends, and thus two separate mounting connections. In those situations where space requirements are critical, such valves, even if very small, are highly inconvenient and often totally unfeasible.

One attempted solution has been the use of small coaxial tire valves; however, these and the other valves described above, all have additional features that render them unsuited for the apparatus in question. The rubber or plastic seal elements of ordinary valves which function satisfactorily in normal situations, will become severely damaged or ruined when a valve with a cryogenic device as described is cleaned by being evacuated and "baked-out" at a very high temperature. Also, in the operation of these refrigerators which are charged with a gas such as helium through the valve, it has been found that the gas becomes contaminated by diffusion of water vapor through the plastic or rubber parts exposed to atmosphere. The typical coaxial tire valves have no positive shut-off capability which renders them unreliable, and also prevents closing while the source of gas under pressure is still connected and charging. Furthermore, these valves have no positive opening capability; thus the valve cannot easily be opened when the apparatus is subjected to an internal vacuum during cleaning and bake-out.

SUMMARY OF THE INVENTION

The coaxial, positive-shutoff valve of the present invention is for use and combination with apparatus having an inner chamber to be charged with a fluid under pressure. Attachable to the apparatus housing is a tubular base part of the valve with a duct therethrough defining a valve seat in one portion of the duct. Other components of the valve are a piston having one part that seals with the seat and a second part with a second duct therethrough, and a flexible tubular closure means sealed to the base and piston and defining a flow chamber adjacent the piston and communicating with the valve seat and the second duct. An actuator is provided for moving the piston relative to the base for closing and opening the valve.

In one preferred embodiment the piston is movable axially, the closure means is an axially extendible metal bellows, and the actuator is positively engaged to the piston so that they move together axially when the actuator is rotated. In this embodiment the flow chamber is sealed and thus prevents diffusion of water vapor into the gaseous fluid that would occur through plastic or rubber sealing elements. The flow chamber communicates through the duct in the base to the apparatus chamber, and through the piston duct to a source of fluid or to the atmosphere. When the piston duct is closed and the base duct is open, fluid under pressure from the apparatus chamber, would tend to elongate the bellows to the extent permitted by the actuator to which the bellows is engaged. A safety feature of the new invention is an auxiliary closure that closes the piston duct, and also has shoulders that bar removal of the actuator prior to removal of the auxiliary closure. Therefore, when the actuator is removed or released, leaving the bellows unsupported, the bellows could not be under excessive pressure, because the auxiliary closure would necessarily be open also. Additionally the flow chamber of this new valve is designed such that the pressure of gas initially entering the valve through the piston duct will create a force tending to open the valve automatically.

BRIEF DESCRIPTION OF THE DRAWING

FIG. 1 is a fragmentary elevation view of a prior art valve and apparatus.

FIG. 2 is a fragmentary elevation view of a second prior art valve and apparatus.

FIG. 3 is a fragmentary elevation view of one embodiment of the valve of the new invention.

FIG. 4 is a fragmentary elevation view of a second embodiment of the new invention.

DESCRIPTION OF THE PREFERRED EMBODIMENT

Figure 5:
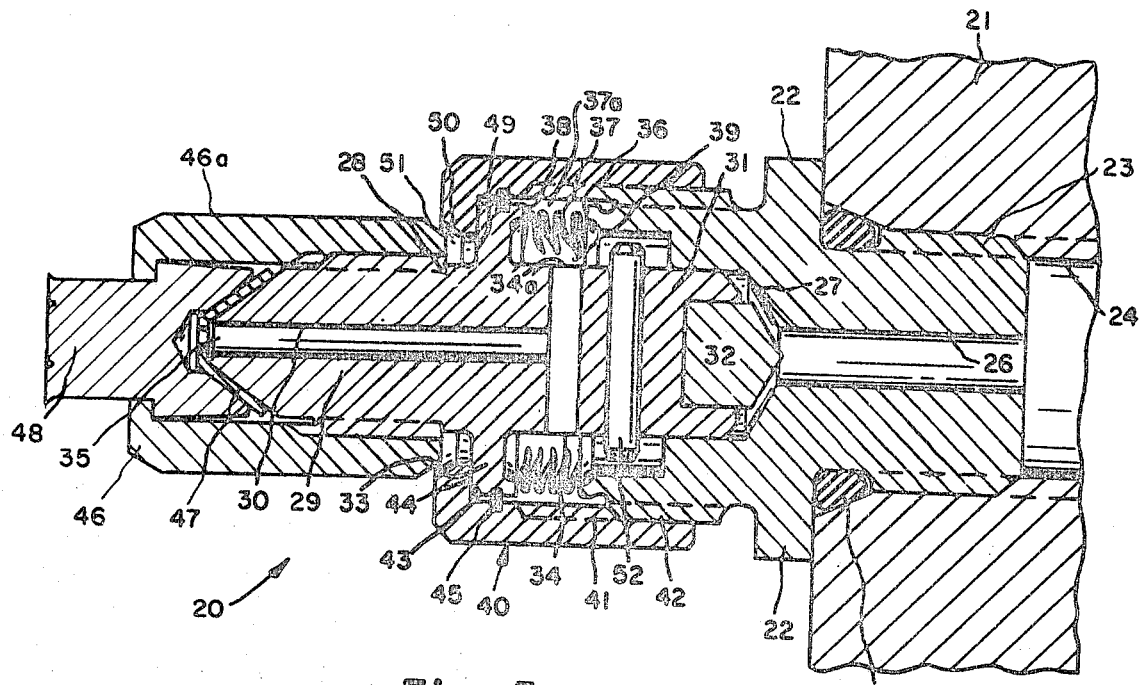
FIG. 5 is a sectional view of the invention of FIG. 3.

FIGS. 1 and 2 disclose prior art valves 10 and 10' of the gate or globe type having handles 11 and 11' separate from the inlet ports 12, 12' and outlet ports 13 and 13'. As shown regarding different valves of the same capacity, valve 10 occupies a substantially large amount of space, and valve 10' requires two separate mounting connections 14 and 15. In contrast to the prior art, the new valve 16 of FIG. 3 or the embodiment 17 of FIG. 4, as used in combination with apparatus 18 being charged with a fluid under pressure, is small, requires a single mounting connection, and has other important features described below.

The preferred embodiment 20 of the present invention is shown in FIG. 5 in combination with the bulkhead or mounting plate 21 of a partially shown apparatus having an inner chamber (not shown) chargeable with pressurized gas. The tubular base part 22 of the valve has an externally threaded portion 23 that is securable into aperture 24 with a compressible O-ring seal 25 disposed at the junction of these members.

An internal duct 26 extends along the length of the base defining near the mid-point a valve seat 27. Coaxially disposed with the base is piston 28 having a tubular part 29 with duct 30, therethrough, and a second part 31 with a valve seal 32 secured thereto for cooperation with the valve seat 27 when the piston is moved axially. Extending radially outward from a middle part of the piston is a flange 33, and duct 30 has first openings 34, 34a and axially spaced therefrom on the other side of the flange 33 a second opening 35.

Between the flange and the base's adjacent edge 36 is an axially extendible metal bellows sealing means 37 that has a first end welded to edge 36 and its second opposite end welded to the flange surface 38. There is thus defined within the bellows a sealed flow chamber 39 extending from the valve seat 27 to opening 34 of the bore 30. The bellows, being spring-biased, resiliently urges the piston 28 to move axially (left as seen in FIG. 5) for spacing the valve seal 32 away from seat 27, thus opening the valve.

For manual operation of the valve, there is a cylindrical actuator 40 that generally surrounds bellows 37 and has on one open end, internal threads 41 for engaging a corresponding neck part 42 of the base 22, and on the opposite end an opening defining shoulder 43 engaging an adjacent surface 44 of the flange. Rotation of this actuator moves it and the piston 28 axially (to the right as shown), thus overcoming the axial force of the bellows and driving the valve seal 32 into the valve seat 27; counter-rotation of actuator 40 permits the bellows to expand axially, pushing the piston, thus opening the valve. Snap ring 45 within the actuator may be used to "positively" engage and move the piston to the right and left, particularly if the axial force exerted by the bellows is not strong. Duct opening 35 at the remote end of piston 28 is sealable by an auxiliary closure 46 which includes a conical metal seal element 47 and a pressure member 48. Closure 46 is a cylinder that is threadedly engaged to the piston, and has an outer diameter at 46A greater than inner diameter 49 of the actuator 40. Thus while closure 46 is secured as shown, actuator 40 can be moved axially toward the left until such motion is halted by contact of shoulders 50 and 51 of these elements. Subsequent rotation of closure 46 permits removal thereof, followed by removal or at least full opening of actuator 40.

One other feature of this embodiment is transverse pin 52 which has at least one end extending out of piston 28, this end being engagable in an axial groove of the base to prevent rotation of the piston during rotation of either actuator 40 or closure 46. Rotation of the piston is to be avoided because the bellows attached between the piston and base is designed only for axial flexibility.

Figure 6:
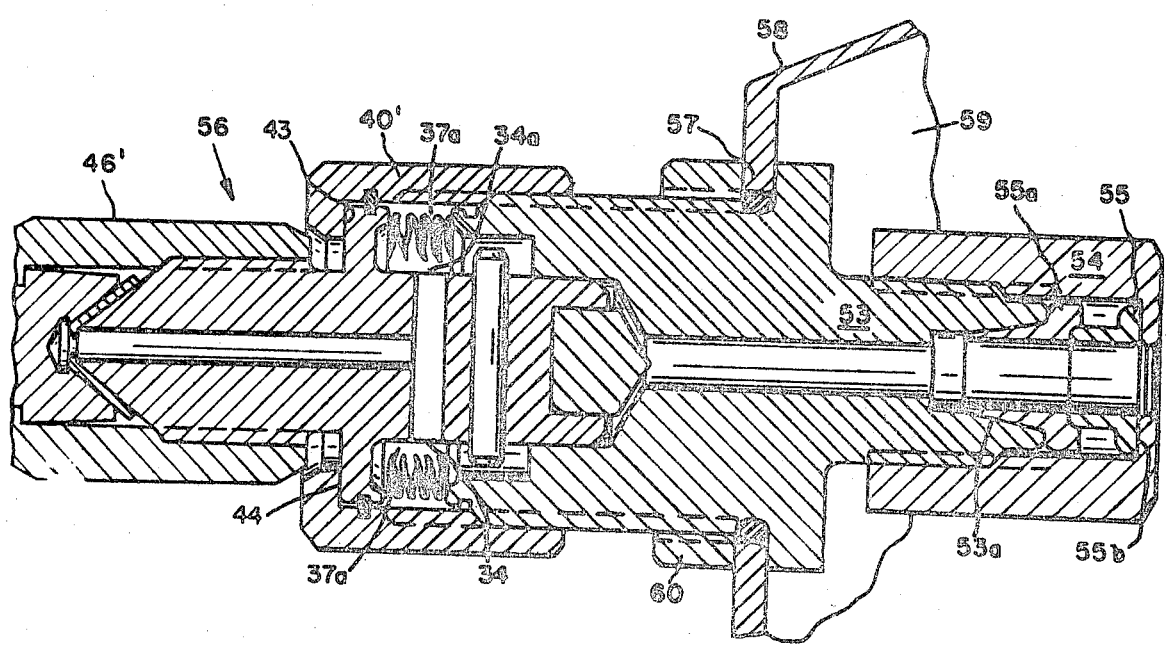
FIG. 6 is a sectional view of the invention of FIG. 4.

The embodiment of FIG. 6 differs from FIG. 5 regarding two structural features. The remote end 53 has a fitting 54 for receiving the end of a tube, and maintaining a fluid seal. After a tube end is inserted into the bores of ring elements 55 and 55a, rotation of fitting 54 applies axial force at 55b urging element 55 toward the left against 55a, and element 55a toward the left against tapered surface 53a, as shown, which causes element 55a to be radially compressed for secure gripping of the tube previously inserted into the bore of these elements. It is contemplated that this embodiment be installed by the following steps: remove closure 46'; remove actuator 40'; insert end 56 of the valve through opening 57 in bulkhead 58 from left to right as shown until shoulder 59 abuts the bulkhead; add threaded fastener 60; add actuator 40'; and finally add closure 46'. This procedure is in contrast to engaging only the threaded end 23 of the base's tubular stem part 22 in FIG. 5 to an aperture of a housing.

The operation of either of the valves shown in FIGS. 5 and 6, involves both charging the apparatus chamber (not shown) with a fluid under pressure, and subsequently permitting discharge of this fluid. Assuming the valve is installed, charging requires removal of closure 46 and attachment of a fluid source to end 29 of the piston. Rotation of actuator 40 opens valve seal 32 permitting a fluid flow through duct 30, flow chamber 39, and then duct 26. In discharging the apparatus' inner chamber via duct 26, obviously actuator 40 must be rotated to open valve seat 27. If the closure 46 were still sealed, fluid pressure in the flow chamber 39 would tend to drive the piston toward the left which would elongate bellows 37. Such elongation would be limited so long as piston flange 33 was supported by the actuator shoulder 43; otherwise excessive elongation would damage or rupture the bellows. Damage in this manner is prevented because actuator 40 cannot be removed unless closure 46 is removed first; and removal or mere opening closure 46 releases the internal fluid pressure, so that the bellows cannot be strained.

Finally it should be noted, when the valve is connected to a fluid source or when the valve is sealed, there is metal-to-metal contact of components completely surrounding the flow chamber. Thus the metal enclosure prevents any contamination of the flowing fluid (particularly helium gas) by water vapor diffused through rubber or plastic seal elements which are exposed to the atmosphere in prior art expandable valves. More particularly, seal element 47 is metal, bellows 37 is metal and welded between the piston and base, and seal 32 is an interior element surrounded by metal. In embodiments where seal 32 is also metal, then the entire valve with the associated apparatus can be baked-out at high temperature and evacuated as required for proper cleaning.

The actuator 40 provides a safety as well as operational function, because it emcompasses bellows 37 defining annular chamber 37a which can collect any fluid that might leak past bellows 37 if a leak developed. Closure 46 also functions as a secondary seal, should principal seal 32 leak; and one additional seal is O-ring 25 between the valve and the apparatus housing. With all the features discussed above, the valve of the new invention is still a very small, but highly rugged and reliable component.

What is claimed is:

1. A valve for use in transferring fluid through a wall of a housing defining a closed chamber, comprising, a tubular metal base having a stem part with a duct therethrough and a valve seat in one part of the duct, the stem being engagable to said housing with said duct and said chamber in communication, a metal piston coaxially disposed and movable with respect to the base, the piston having a seal part for contacting and closing the valve seat, and a tubular part defining a duct therethrough, the duct having one end in communication with said closure means and a remote open end, an axially extendible, generally cylindrical metal closure means at least partially surrounding the piston and having a first part engaged and sealed to the base, and a second part engaged and sealed to the piston, thus defining between the closure means and an adjacent part of the piston a generally annular flow chamber communicating between said valve seat and said duct of the piston, and actuator means having one part engaging the base and movable with respect thereto, and a second part engaging the piston for positively moving the piston and its valve seal into and out of contact with the valve seat for closing and opening the valve, the apparatus further comprising an auxiliary closure for sealing said remote end of the duct and a metal auxiliary sealing means secured between this auxiliary closure and the remote end of the duct, the auxiliary closure being movable from its open position to its closed position where it engages the actuator, with the actuator and associated piston movable from their closed to open position only after the auxiliary closure is returned to its open position.

2. Apparatus as defined in claim 1 wherein the base, the piston, the closure means, the actuator means, and the auxiliary closure are all round cylindrical elements, coaxially disposed, with said ducts in the piston and base also being coaxially located.

* * * * *